(No Model.)

H. F. MORROW.
HYDRAULIC RAM.

No. 250,567. Patented Dec. 6, 1881.

WITNESSES:
C. Neveux
C. Sedgwick

INVENTOR:
H. F. Morrow
BY Munn & Co
ATTORNEYS.

N. PETERS, Photo-Lithographer, Washington, D. C.

UNITED STATES PATENT OFFICE.

HENRY F. MORROW, OF CHESTER, PENNSYLVANIA.

HYDRAULIC RAM.

SPECIFICATION forming part of Letters Patent No. 250,567, dated December 6, 1881.

Application filed March 15, 1881. (No model.)

*To all whom it may concern:*

Be it known that I, HENRY F. MORROW, of Chester, in the county of Delaware and State of Pennsylvania, have invented a new and useful Improvement in Hydraulic Rams, of which the following is a full, clear, and exact description.

The object of this invention is to provide a more simple, effective, durable, and powerful machine for raising water.

Figure 1:
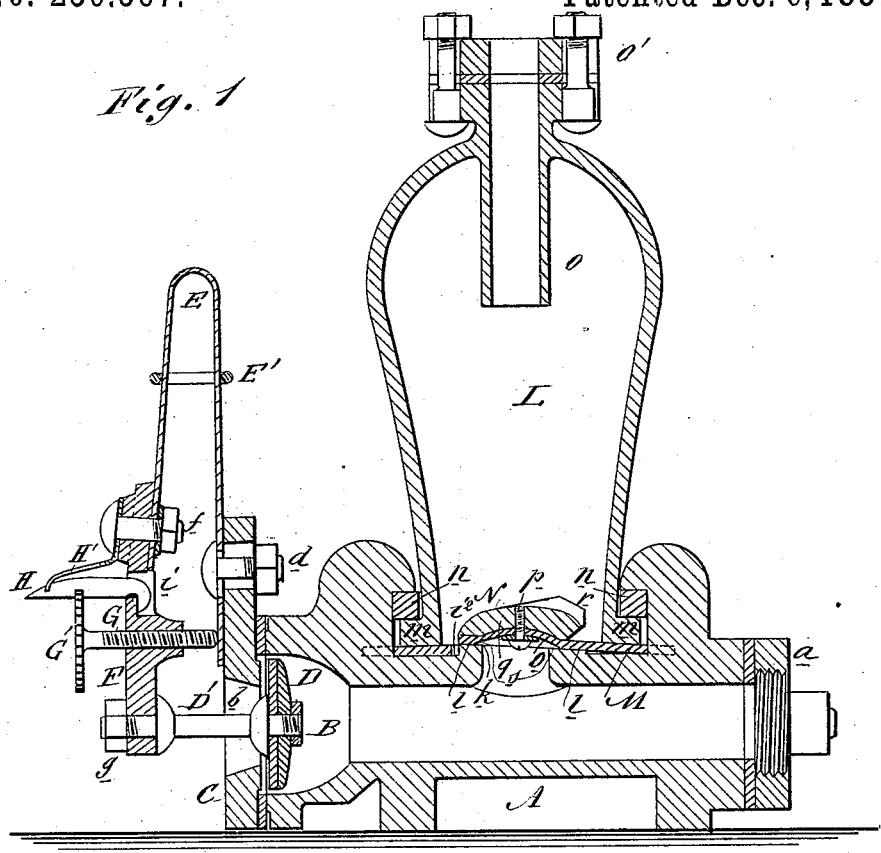
Figure 2:
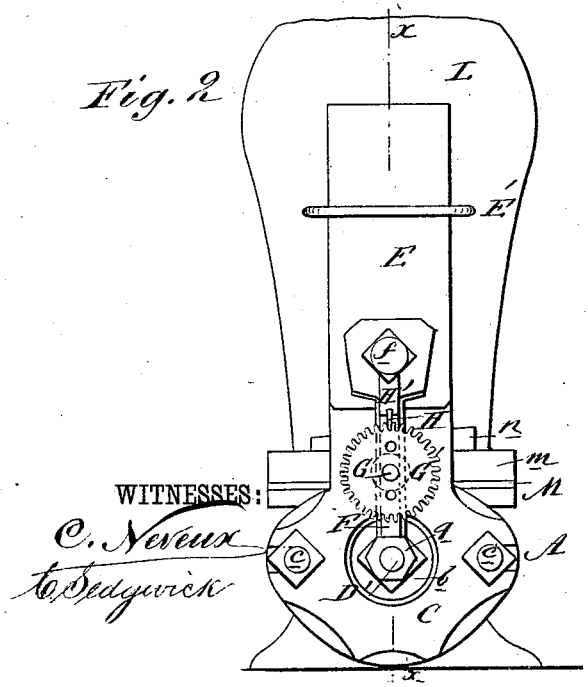
Figure 3:
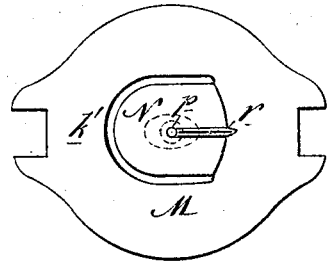

Figure 1 is a sectional side elevation of the same on line $x\ x$, Fig. 2. Fig. 2 is a front elevation of the same. Fig. 3 is an enlarged plan of the inlet-valve.

Similar letters of reference indicate corresponding parts.

In the drawings, A represents the body of the ram, consisting of a strong metallic cylinder having at one end a coupling, $a$, for the attachment of the feed-pipe, the other end being enlarged into a water-box, B, whose mouth is closed by a plate, C, provided with a central opening, $b$, that is secured on that end of the cylinder A by bolts and nuts $c$ or other suitable device. Said plate C serves as the valve-seat for the horizontally-moving outlet-valve D, that is within the water-box B, and has its stem D′ extended out through the opening $b$ in said plate C.

A U-spring, E, has one leg secured by bolt and nut $d$ to the upper part of the plate C, and has secured to its opposite leg by bolt and nut $f$, a rigid connecting-bar, F, which extends downward and holds in its lower end the valve-stem D′, that is secured therein by nut $g$. An adjusting-screw, G, is passed through the bar F, so that it may be turned against the plate C for the purpose of adjusting the tension of the spring E, and thereby governing the stroke of the valve D. This adjusting-screw G has a toothed wheel, G′, fixed on its outer end, as shown. A dog, H, has one end entered and hooked into a socket, $i$, in the bar F, and, extending outward, rests on this wheel G′ of the adjusting-screw G, and a spring, H′, held by the bolt and nut $f$, pressed down on the said dog H, thereby holding the latter in the teeth of the wheel G′ of the screw G. With this improved regulating device the valve-governing parts E F G can be readily adjusted and held at any desired degree of tension. A clamp, E′, set on the spring E, may be moved down for increasing the tension of said spring E when desired.

In hydraulic rams as ordinarily made, it is difficult to adjust the valve-screw G with delicacy, and, furthermore, the constant pulsation or jar of the outlet-valve tends to "back out" the said screw, whereby the tension of the spring is reduced and the effective working of the valve interfered with. The improved set-screw wheel and dog G′ H obviate this difficulty, as the latter, engaging in the teeth of the former, will not only prevent the backing out of the set-screw G, but enable the operator to secure the adjustment of the valve D with the greatest nicety.

On the top of the cylinder A is a seat, $i^2$, of circular form, having formed therein an oval opening, $k$, about which is an inclined circumferential flange, $l$, that forms a valve-seat.

L is the air-chamber, having a base-flange, $m$, that rests upon a washer, M, and is held in place by wedges $n$, driven between the upward-projecting hooked lugs of the cylinder A and said base-flange $m$, as shown.

A leather washer, M, having an oval opening, $k'$, in it to conform with the opening $k$, is interposed between the base-flange $m$ of the air-chamber L and the flange $l$ of the cylinder A.

The washer M is cut so that a flap, $o$, is formed that nearly covers the opening $k'$, and on this flap $o$ is secured, by a screw-bolt, $p$, the inlet-valve N, which has a concavity in which the flap $o$ and head of bolt $p$ are countersunk, as it were, in the face of said valve N, and consequently present no impediment to the flow of water through the opening $k$, and thereby cause the ram to work more freely and with less expenditure or waste of power.

In the hydraulic rams in common use the leathern part of the inlet-valve or the flap $o$ seats on the edges of the inlet-opening $k$, and thereby a ridge is soon formed in said flap, which, as it increases, protrudes into and partly fills the inlet opening, prevents the tight seating of said flap, and obstructs the flow of the water. This objection is avoided in this instance by making the concavity $q$ of the valve N of larger circumference than the valve-opening $k$; hence the flap $o$ does not seat on the edges of the opening $k$, but at some distance back of them, as shown at $s$, thereby always maintaining a flat seat and tight joint. This valve N is provided on its top with a sharp ridge, $r$, that acts after the manner of a cut-water.

In horizontal hydraulic rams of ordinary construction, air accumulates in the air-chamber until the water with difficulty gets access thereto, and consequently the ram labors in its work and does not operate effectively. To remedy this defect an open tube, O, is introduced down through the top of the air-chamber L to a little below the water-level therein, which tube O serves as the water discharge pipe, as well as to prevent the excessive accumulation of air in the chamber L. Whenever, in the operation of the ram, the accumulated air has pressed the water in the air-chamber L down to about the end of said tube O, the greater portion of the air will escape through the said tube O, and restore the air-pressure within said chamber L to its normal and most efficient point.

The momentum of the water flowing into the body of the ram A causes it to close the valve D, thus shutting off the water and causing it to spend its energy in forcing a portion of itself through the valve-opening $k$ into the chamber L, wherein the compression of the air creates a discharge of water through the pipe or tube O. To the top of this tube O is attached a coupling, O', for connecting an extension pipe or tube.

Having thus described my invention, I claim as new and desire to secure by Letters Patent—

The combination, with the screw G, having notched wheel G', and the bar F, having the socket $i$, of the spring-dog H, the whole arranged to operate in connection with a hydraulic ram, as and for the purpose specified.

HENRY F. MORROW.

Witnesses:
I. I. STORER,
C. SEDGWICK.